No. 728,419. PATENTED MAY 19, 1903.
S. A. SCHELLENGER.
BALL AND SOCKET KNUCKLE.
APPLICATION FILED FEB. 19, 1903.
NO MODEL.
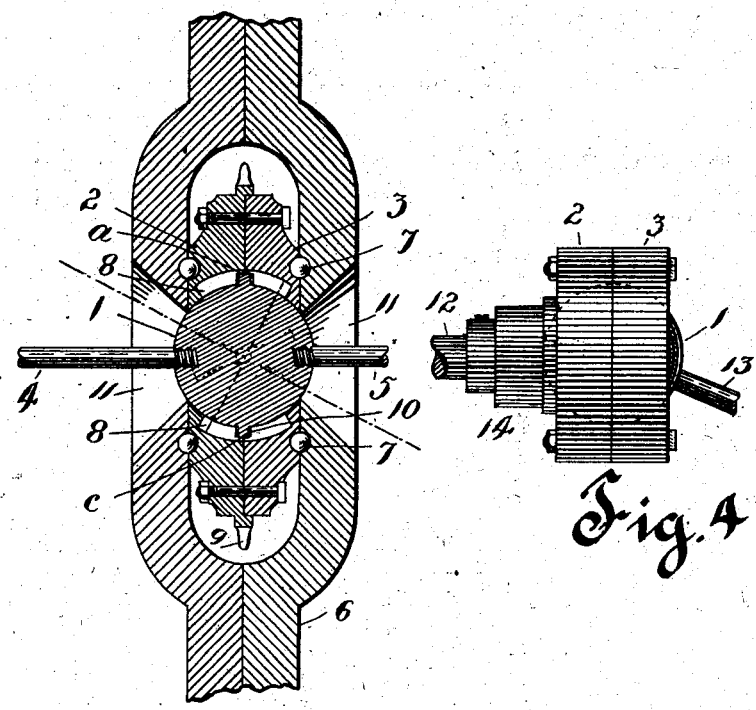
Fig. 1.
Fig. 4.
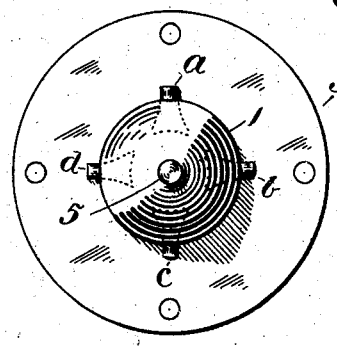
Fig. 2.
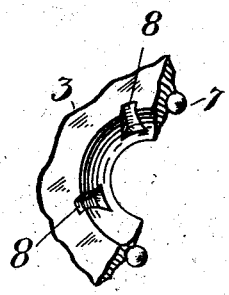
Fig. 3.
WITNESSES:
Albert Newcomb
Dorothy Kincaid.
INVENTOR
Silas A. Schellenger
BY Kincaid & Co.
ATTORNEYS No. 728,419. Patented May 19, 1903.

UNITED STATES PATENT OFFICE.

SILAS A. SCHELLENGER, OF GRIDLEY, CALIFORNIA.

BALL-AND-SOCKET KNUCKLE.

SPECIFICATION forming part of Letters Patent No. 728,419, dated May 19, 1903.

Application filed February 19, 1903. Serial No. 144,165. (No model.)

*To all whom it may concern:*

Be it known that I, SILAS A. SCHELLENGER, a citizen of the United States, residing at Gridley, in the county of Butte and State of California, have invented certain new and useful Improvements in Ball-and-Socket Knuckles; and I do hereby declare the following to be a full, clear, and exact description of the invention, such as will enable others skilled in the art to which it appertains to make and use the same.

Generally speaking, my invention relates to improvements in universal joints, which are provided to connect objects in such a manner as to allow freedom of motion in every direction within certain defined limits. To be more specific, however, my invention is a ball-and-socket knuckle.

My invention possesses all the requisites of strength and durability of this general class of devices and is especially simple in construction and efficient in operation.

A further object of my invention is to shield and protect the operative parts of the device from dust, dirt, and other foreign matter, and thereby add to the life of the parts, as well as protect them from fouling, as they would be apt to do were the revolving portions left in as exposed a condition as the ordinary universal joint.

My invention more particularly resides in the novel combination, construction, and arrangement of parts, all as more fully hereinafter described, and set forth in the claims.

I am enabled to accomplish the above objects by the means illustrated in the accompanying drawings, in which—

Figure 1 is a central transverse section of my ball-and-socket knuckle. Fig. 2 is a front elevation of the half-plates forming the socket, showing the ball positioned therein. Fig. 3 is a perspective view of a portion of one of the plates forming the socket, showing the grooves for the reception of the ball-pins. Fig. 4 is a side elevation of the device with the sprocket-wheel omitted and the parts modified to connect shafts at an angle.

I will now explain the construction of the several parts of my invention and subsequently set forth the operation of the same, reference being had to the above views by characters.

The main portions of the device consist of the nicely-turned spherical ball 1 and the two half-plates 2 and 3. Each of these plates 2 and 3 is formed with an approximate semispherical pocket, which forms, when the plates are bolted together, as shown in Fig. 1, a socket for the universal action of the inclosed sphere 1. Threaded into the sphere 1 and at diametrically opposite points thereon are the shafts 4 and 5, to the outer extremities of which are connected the wheels of an automobile or other shifting mechanism. As a guide or stationary bearing for the plates 2 and 3 I have provided the yoke 6 and trains of balls 7.

Now in order to make the sphere 1 operative with the revolution of the plates 2 and 3 and at the same time permit of its independent shifting within certain limits I have provided the four pins $a$, $b$, $c$, and $d$, all in the same plane and ninety degrees apart. These pins engage with suitable grooves 8, cut in plates 2 and 3. The grooves must necessarily increase in width as they leave the edge of the semicircular pocket, in order to permit of free action of the pins.

Now it will be readily seen that as the plates 2 and 3 are revolved, either by means of the sprocket-teeth 9 or by any other mechanism, the sphere 1 and shafts 4 and 5 will receive the motion and at the same time be free to shift their positions, as in the direction of the broken line in Fig. 1. The yoke 6 is reamed out at 11 to permit of this shifting. In order to diminish the friction of the pins $a$, $b$, $c$, and $d$, I have encircled each by a hard collar or roller 10.

In Fig. 4 the shafts 12 and 13 are at an angle to each other, and consequently the former is connected to plate 2 by means of the hub 14. In this case the yoke 6 is omitted.

Having thus fully described my invention, the operation and advantages of the same will, it is thought, be readily understood.

I am aware that changes in the form and proportion of parts of the devices herein described as an embodiment of my invention can be made without departing from the spirit or sacrificing the advantages thereof, and I therefore reserve the right to make such changes, substitutions, and alterations as fairly fall within the scope of my invention.

What I claim, and desire to secure by Letters Patent, is—

1. A device of the class described consisting of a spherical ball, two plates formed with similar cavities forming when united a socket for the reception of said ball, four pins projecting from said ball, there being corresponding grooves in said plates for the action of said pins, said grooves expanding in width toward their extremities substantially as and for the purpose set forth.

2. A device of the class described consisting of a spherical ball, two plates formed with similar cavities forming when united a socket for the reception of said ball, four pins projecting from said ball, there being corresponding grooves in said plates for the action of said pins, said grooves expanding in width toward their extremities, and a yoke about said plates and forming a suitable bearing therefor substantially as and for the purpose set forth.

In testimony whereof I affix my signature in presence of two witnesses.

SILAS A. SCHELLENGER.

Witnesses:
GEORGE PATTISON,
ORPHA LE POOR.